(No Model.)

J. C. FRY.

CINDER, DUST, AND SMOKE EXCLUDER FOR CAR WINDOWS.

No. 492,671. Patented Feb. 28, 1893.

Witnesses

Inventor
John C. Fry
by Wm. T. S. Curtis
Attorney

UNITED STATES PATENT OFFICE.

JOHN C. FRY, OF LARNED, KANSAS.

CINDER, DUST, AND SMOKE EXCLUDER FOR CAR-WINDOWS.

SPECIFICATION forming part of Letters Patent No. 492,671, dated February 28, 1893.

Application filed June 18, 1892. Serial No. 437,185. (No model.)

*To all whom it may concern:*

Be it known that I, JOHN C. FRY, a citizen of the United States, residing at Larned, in the county of Pawnee and State of Kansas, have invented certain new and useful Improvements in Cinder, Dust, and Smoke Excluders for Car-Windows; and I do hereby declare the following to be a full, clear, and exact description of the invention, such as will enable others skilled in the art to which it appertains to make and use the same.

Figure 1:
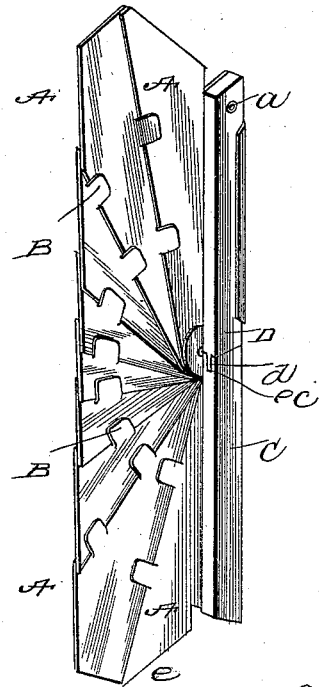
Figure 2:
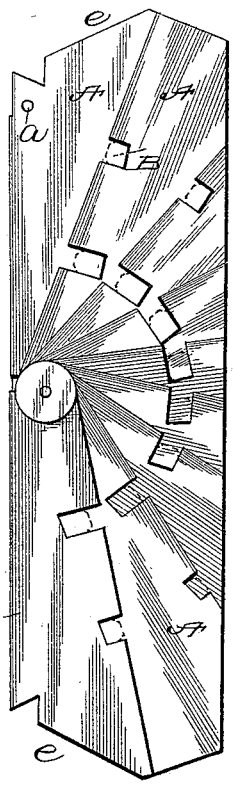
Figure 3:
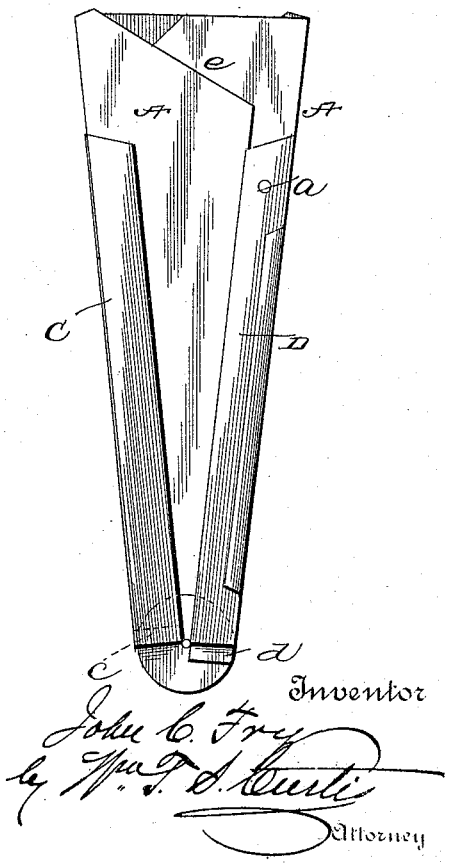

My invention relates to certain new and useful improvements in dust and cinder deflectors for car windows, and has for its object to provide such a device that shall be portable and capable of being readily applied to the window and with equal ease be removed and folded up into a compact form so that it may be carried in the pocket, and to these ends my invention consists in the novel construction and arrangement of parts hereinafter described and afterward definitely pointed out in the claims, due reference being had to the accompanying drawings forming a part of this specification wherein, Figure 1 is a perspective view showing the deflector applied to a car window; Fig. 2 a side elevation of the device unfolded; Fig. 3 a view showing the same folded up for transportation.

Referring to the drawings the letter A, &c., indicate thin metallic plates triangular in shape and pivoted together at their smaller ends after the manner of a fan. Each of said plates is provided at one side with one or more tongues B, preferably formed by making two slits in the edge of the plate and then bending up the metal between the slits to form the tongue. When the deflector is unfolded into position for use the tongues of each of the plates are slipped over the edge of the adjacent plate, thus firmly locking together all the plates. I preferably provide the larger plates, as A with two tongues, and the other with only one, but the number of tongues to each plate is not material. The outer ends of the plates are cut at an angle, as shown, so that when said plates are unfolded or spread out their outer edges will form a continuous straight line. The inner edge of one of the plates A is bent up at a right angle to said plate and has secured thereto by means of nails, or other suitable means, a wooden strip C, and to the outer rear edge of the other strip A is pivoted at *a*, a similar strip D. The inner end of the strip C is mortised, as shown at *c*, and the inner end of the strip D is provided with a tenon *d* adapted to fit within said mortise. To unfold the device for use the plates are spread and engaged one with another, as before described, and the strip D swung rearwardly about its pivot *a* until the tenon *d* enters the mortise *c*, thus locking the plates in their spread condition and preventing the same from being folded up. The device is now ready for use, and the window being raised the strips C and D are inserted in the groove of the window sash and the window lowered upon the upper end of the same.

The larger ends of the plates A, A, are beveled, as shown at E, to correspond with the inclined sill of the window and at their extreme inner ends are notched and oppositely inclined, as at *e*, to correspond with the beveled lower edge of the window sash. By forming the opposite ends of the plates A, A, and strips C and D alike, it will be obvious that the device can be used upon either side of the window and upon either side of the car.

To fold the device for transportation the strip D is swung outward upon its pivot until the tenon *d* disengages the mortise *c*, and the plates disengaged from the tongues B, when the whole may be folded up like a fan.

What I claim is—

1. A dust and cinder deflector consisting of triangular plates pivoted together at their smaller ends, one edge of each of said plates being provided with one or more tongues which engage the edge of the adjacent plate when unfolded for use, substantially as described.

2. In a dust and cinder deflector, the combination of triangular plates pivoted together at their smaller ends, one edge of each of said plates being provided with one or more tongues adapted to engage the edge of the adjacent plate, and strips secured to the inner edges of each of the outermost plates, substantially as described and for the purpose specified.

3. In a dust and cinder deflector, the combination of the plates A, pivoted together at their smaller ends and provided with tongues B, of the strip C rigidly secured to the outer edge of one of the plates A and the strip D pivoted at its outer end to the other plate A, substantially as described and for the purpose specified.

4. In a dust and cinder deflector, the combination of the plates A, pivoted together at their smaller ends and provided with tongues, of the strip C rigidly secured to the outer edge of one of the plates A and provided at its inner end with a mortise $c$, and the strip D pivoted at its outer end to the other plate and provided at its inner end with a tenon $d$, substantially as described and for the purpose specified.

In testimony whereof I affix my signature in presence of two witnesses.

JOHN C. FRY.

Witnesses:
   J. E. HOUSTON,
   H. TALCOTT.